United States Patent [19]
Frazier, Jr. et al.

[11] Patent Number: 5,940,401
[45] Date of Patent: Aug. 17, 1999

[54] CARRIER EXTENSION FOR GIGABIT/SECOND ETHERNET NETWORKS OPERABLE UP TO AT LEAST 200 M DISTANCES

[75] Inventors: Howard M. Frazier, Jr., Pleasanton; Ariel Hendel, Cupertino, both of Calif.

[73] Assignee: Sun Microsystems, Inc., Mountain View, Calif.

[21] Appl. No.: 08/781,417

[22] Filed: Jan. 10, 1997

[51] Int. Cl.⁶ .................................................. H04L 12/413
[52] U.S. Cl. ............................................ 370/445; 370/471
[58] Field of Search ..................................... 370/445, 446, 370/447, 448, 470, 472, 474, 476, 465, 471

[56] References Cited

U.S. PATENT DOCUMENTS

| | | | |
|---|---|---|---|
| 5,027,348 | 6/1991 | Curry, Jr. ................................. | 370/445 |
| 5,193,151 | 3/1993 | Jain ...................................... | 395/200.67 |
| 5,461,618 | 10/1995 | Chen et al. ............................ | 370/470 |
| 5,619,646 | 4/1997 | Hoch et al. ............................ | 370/476 |

*Primary Examiner*—Min Jung
*Attorney, Agent, or Firm*—Flehr Hohbach Test Albritton & Herbert LLP

[57] ABSTRACT

Transmission rates of 1 Gb/sec. at up to at least 200 m diameter distances are achieved in an Ethernet environment by functionally decoupling frame size to network roundtrip time. This decoupling is achieved by extending the duration of the minimum size event to exceed the network roundtrip time. This extension of the carrier event is made without extending the data field and without altering the frame check sequence. Code implementing the media access control layer and reconciliation layer at the transmitting and receiving end of the network is modified such that at 1 Gb/sec. half-duplex, non-data symbols are appended to the end of short packet frames. The collision window is extended to include these symbols, which extension symbols are also included in fragment discard calculations. The extension is removed, however, before checking the frame check sequence, and before passing the frame to logical link and control. In a switched environment, the extension is not propagated to network links operating at less than 1000 Mb/sec. flowrates, which feature makes the invention backward compatible with existing slower transmission rate Ethernet networks. In full-duplex Ethernet environments, the media access control does not form the carrier extension.

17 Claims, 9 Drawing Sheets

CARRIER EXTENSION FOR GIGABIT/ SECOND ETHERNET NETWORKS OPERABLE UP TO AT LEAST 200 M DISTANCES

FIELD OF THE INVENTION

This invention relates to Ethernet networks in general, and more specifically to implementing Ethernet networks with gigabit/second flowrates at diameter distances up to at least 200 m.

BACKGROUND OF THE INVENTION

A network is a communications facility that permits a number of workstations, computers or other equipment (hereinafter collectively "computer(s)") to communicate with each other. Portions of a network involve hardware and software, for example, the computers or stations (which individually may comprise one or more central processing units, random access and persistent memory), the interface components, the cable or fiber optics used to connect them, as well as software that governs the access to and flow of information over the network. In networks in which data flow is 100 Mbits/sec. ("Mbps") or higher, the transmission medium is often fiber optics. In networks in which a slower data rate is acceptable, e.g., 10 Mbps, the transmission medium may be coaxial cable or, as is often the case for an Ethernet network, twisted wires.

In a network, network architecture defines protocols, message formats and other standards to which the computers and other equipment, and software must adhere. Most network architectures have adopted a model comprising functional layers in which a given layer is responsible for performing a specific set of functions, and for providing a specific set of services. Thus, the services provided by each layer and the inter-layer interfaces can define a network architecture. Protocols define the services covered across a layer interface and the rules followed in the processing performed as a part of that service.

Several organizations have proposed models and standards that have been accepted within the networking community. The International Standards Organization ("ISO"), for example, has proposed a seven layer reference model for computer networking that is called the open systems interconnect ("OSI") architecture. Another set of standards has been promulgated by the Institute of Electrical and Electronics Engineers ("IEEE") set of proposed local area network ("LAN") standards known as IEEE Project 802. This model conforms to the seven-layer OSI model, but directly solely to the lowest two OSI layers, namely the physical layer and the data link layer.

FIG. 1A depicts a network according to the IEEE Project 802 modification to the ISO seven layer model, in which two computers 10, 10' are can communicate data to each other over a physical link medium 20, e.g., cable. In practice, a repeater system 120 may be coupled in series with cable 20, the distances between a computer and repeater being D1 and D2. If there are no repeaters, the distance between computers 10, 10' is given by D1+D2. Of course, in practice, a network may have many hundreds of computers rather than two, and the distance D1+D2 separating adjacent computers may vary from a few meters to many Kms. For a computer network implemented within a single office building, separation distances D1+D2 of perhaps 200 m are typical.

The bottommost layer 30 in both the ISO and Project 802 model is a physical layer that is concerned with connections between two machines (e.g., computers 10, 10') to allow transmission of bit streams over a physical transmission medium (e.g., cable 20). Thus, physical layer 30 is concerned with types of cabling, cable plugs, connectors, and the like.

As will be described shortly, the present invention is directed to Ethernet networks adhering to the carrier sense multiple access with collision detection ("CSMA/CD") standard. In the 802 model for CSMA/CD, a Media Independent Interface ("MII") standard exists for the reconciliation sublayer 40 interface between physical layer 30 and a media access control ("MAC") sublayer 50B.

Under MII, data and delimiters are synchronous to the corresponding clock, and two asynchronous media status signals are provided, namely carrier sense ("CRS"), and collision ("COL"). MII provides a two wire serial management interface for control and status gathering, namely management data clock ("MDC"), and management data input/output ("MDIO"). In the OSI seven-layer model, the layer above the physical layer is a data link layer that is responsible for error-free transmission of data frames between network nodes. A data link control protocol describes operation and interfaces of this layer, which must also shield higher layers in the model from concerns about the physical transmission medium.

But in the 802 model shown in FIG. 1A, the data link layer is subdivided into MAC layer 50B and an overlying logical link control ("LLC") layer 50A. The media access control sublayer is concerned with access control methods to determine how to control the use of the physical transmission medium. The LLC sublayer 50A is responsible for medium-independent data link functions and allows the network layer 60 above to access LAN services independently of how the network is implemented. According to the 802 architecture, LLC sublayer 50A provides services to network 60 in the same fashion as would a conventional data link protocol in a wide area network.

The MAC sublayer 50B provides services to the overlying LLC sublayer 50A, and manages sharing of the transmission medium among the different stations on the network. A media access management function receives a frame from the data encapsulation function after the necessary control information has been added. Thereafter, media access management is responsible for ensuring physical transmission of the data. The data frame in an Ethernet full-duplex environment has a maximum size of 1,518 bytes.

Several 802 standards exist for MAC sublayer 50B, but only the carrier sense multiple access with collision detection ("CSMA/CD") standard is relevant to the present invention, more specifically the 802.3 standard. The existing 802.3 MAC standard presently contains several mechanisms for performing flow control in a half-duplex environment, including a Deference process, and WatchForCollision and BackOff procedures. CSMA/CD defines data encapsulation/decapsulation and media access management functions performed by MAC sublayer 50B itself, the data encoding/decoding function being performed by underlying physical layer 30.

Physical transmission of the data may be ensured using carrier sensing to defer transmission until the network is clear. In brief, a transmitting station (e.g., computer or user 10) listens or monitors the transmission medium (e.g., cable 20) before transmitting to determine whether another station (e.g., computer or user 10') is currently transmitting a message, e.g., to learn whether the medium is free. Using the services of the physical layer 30, the media access management determines whether the transmission medium (or carrier) is presently being used. If the medium is not being used, media access management passes the data frame to physical layer 30 for transmission. Even after transmission of the frame has begun, media access management continues to monitor the carrier. If the carrier is busy, media access management continues monitoring until no other stations are transmitting. Media access management then waits a specified random time to allow the network to clear and thereafter begins transmission.

But other station(s) having messages to send may all listen simultaneously, discern that the transmission medium appears quiet, and begin to transmit messages simultaneously. The result is a collision and garbled messages. If signal collision is detected, receiving stations ignore the garbled transmission, transmitting stations stop transmitting messages immediately and transmit a jamming signal over the medium. Following collision, each transmitting station will attempt to retransmit after waiting for a random backoff-delay time period for the carrier to clear. Thus, a station transmitting must listen sufficiently long to ensure that collision has not occurred.

In FIG. 1A, network layer 60 concerns the routing of data from one network node to another. It is the role of network layer 60 to route data between network nodes.

Transport layer 70 provides data transfer between two stations at an agreed upon level of quality once a connection is established between the stations. Transport layer 70 selects the particular class of service to be used, monitors transmission to ensure maintained service quality, and advises the stations (or users) if quality cannot be maintained.

Session layer 80 provides services that organize and synchronize a dialogue occurring between stations, and manages data exchange between stations. As such, session layer 80 controls when stations can send and receive data, based upon whether they can send and receive concurrently or alternately.

Presentation layer 90 ensures that information is presented to network users meaningfully, and may provide character code translation services, data conversion, data compression and expansion services.

Application layer 100 provides a mechanism for application processes to access system interconnection facilities for information exchange. The application layer provides services used to establish and terminate interuser connections, and to monitor and manage the interconnected systems and the resources they employ.

In general, the network shown in FIG. 1A may be half-duplex (or shared), or full-duplex. In half-duplex, there is a single shared communications path, and at any given time a station can transmit and monitor, or can receive, but can never simultaneously transmit and receive. In a half-duplex environment, MAC layer 50B uses a CSMA/CD algorithm, e.g., IEEE 802.3, such that a station desiring to use the network to transmit must first listen to learn whether the network is busy. If busy, the station desiring to transmit defers transmission but continues to monitor medium status while waiting for the network to become idle. If idle, the station can begin transmitting. While transmitting, the station continues to monitor the network to ensure that another station does not also begin to transmit at the same time, or transmit in an overlapping fashion, e.g., to ensure there is no collision. Similarly, when a station receives data, it is inhibited from simultaneously transmitting.

The present invention is intended for use with half-duplex networks, but is fully compatible with full-duplex networks.

The CSMA/CD algorithm provides a useful pacing mechanism that will inhibit or defer access of arrival new data into the half-duplex network until the network is adequately prepared.

FIGS. 1B and 1C depict CSMA/CD topologies that are found in half-duplex Ethernet network environments. Repeater system 120 topology of FIG. 1B includes a 100 Mb/sec. repeater 130 that is coupled to 10/100 switches 140, 142, and to 100/1 switches 150, 152. Repeater 130 can handle a 100 Mb/sec. flowrate that is suitable for high end desktop computers, while switches 140, 142 handle a 10 Mb/sec. flowrate more appropriate to low end desktop computers. If present, switches 150, 152 handle 1 Mb/sec. flowrates suitable for even lower end systems. The topology of FIG. 1B uses CSMA/CD in a single repeater collision domain within a server room environment.

FIG. 1C depicts a repeater system 120 topology that includes 100 Mb/sec. repeaters 130, 132, 10/100 switches 140, 142, and a 100 Mb/sec. switch 160. The 100 Mb/sec. flowrate available from switch 160, and from repeaters 130, 132 is appropriate for high end desktop computers, while the slower 10 Mb/sec. flowrate available from switches 140, 142 is more appropriate to low end desktop computers.

Although it would be beneficial to use faster repeaters and switches in the topologies of FIGS. 1B and 1B to handle 1000 Mb/sec. signals, the resultant network would not function at 200 m distances, according to the prior art. Indeed, even if repeater and switch transmission rates were increased ten-fold in the configurations of FIGS. 1B and 1C, at a 1000 Mb/sec. flowrate, the maximum transmission distance D1+D2 (the "diameter") would only be about 20 m. The topologies of FIGS. 1B and 1C are symmetrical or bidirectional in the sense that signal flow can be in a left-to-right direction, or in a right-to-left direction.

FIG. 1D depicts the packet format used by prior art Ethernet systems such as that shown in FIG. 1A. A carrier event is defined as the sum of time needed to transmit a preamble, a start frame delimiter ("SFD"), a 6-byte destination address ("DA"), a 6-byte source address ("SA"), a 2-byte type/length field, a data field, and a 4-byte frame check sequence ("FCS") error detection field.

The present invention is directed to the difficulties encountered in Ethernet networks when data, such as the packet shown in FIG. 1D, is to be transmitted at high flowrates over long distances. The CSMA/CD access method relies upon a fundamental assumption that round trip ("R/T") propagation delay in a network is less than the time required to transmit the smallest allowable packet of information. The time required to transmit a packet is inversely proportional to transmission rate. Thus, if transmission rates are increased, then Ethernet distances must shrink in size.

At a 10 Mb/sec. (10 million bits/second) transmission rate, the maximum diameter (D1+D2) of an Ethernet network is limited to 2.5 Km., e.g., the length of linkage 20 in FIG. 1A cannot exceed this distance. If the transmission rate is increased to 100 Mb/sec., the physical size must shrink to approximately 205 m. By extrapolation, if a transmission rate of 1000 Mb/sec. (i.e., 1 gigabit/sec) could be achieved, the maximum network size would shrink to about 20 m, an impractically small size, especially as standard commercial building wiring practices require a network diameter of up to at least 200 m. Unfortunately, according to the prior art, a 200 m network distance would preclude a 1000 Mb/sec. flowrate Ethernet operating in a building whose network cabling was constructed in accordance with standard practices.

Thus, there is a need for a mechanism by which the size of a 1 gigabit/sec. Ethernet network may be extended to cover at least a 200 m limit required by standard building wiring practices. Such mechanism should be backward compatible with 10 Mb/sec. and 100 Mb/sec. systems, and should be compatible with full-duplex as well as half-duplex systems.

The present invention discloses such an mechanism.

SUMMARY OF THE PRESENT INVENTION

The present invention circumvents the limitation inherent in prior art carrier sense multiple access with collision detection ("CSMA/CD") Ethernet environments that dictates that the duration of a minimum size transmission event must exceed the network roundtrip time. At high flowrates, meeting this frame size to roundtrip time constraint can mean the resultant network diameter over which network signals are carried is too small to be practical. The present invention functionally decouples frame size to roundtrip time constraints for CSMA/CD segments in an Ethernet network, which allows faster flowrates over meaningful diameter distances.

The present invention achieves 100 Mb/sec. and indeed 1 Gb/sec. transmission rates at up to at least 200 m diameter distances in an Ethernet environment by selectively extending the duration of the minimum size event to exceed the network roundtrip time. This extension of the carrier event is made without extending the data field (which would degrade throughput in a multi-flowrate switched environment), and without altering the frame check sequence (which would degrade error detection).

The code implementing the media access control layer and reconciliation layer at the transmitting and receiving end of the network is modified such that at 1 Gb/sec. data rates, non-data symbols are appended to the end of short packet frames. The collision detection window is extended to include these symbols, and the extension is also included in fragment discard calculations. Preferably the extension starts on an octet boundary and is an integer number of octets in length. The extension is removed, however, before checking the frame check sequence, and before passing the frame to logical link control ("LLC"). Thus, in a switched environment, the extension is not propagated to network links operating at flowrates slower than 1000 Mb/sec., e.g., 100 Mb/sec., 10 Mb/sec.

Since at slower flowrates no carrier extension is required, the invention is backward compatible with existing slower transmission rate Ethernet networks. Full-duplex Ethernet environments are insensitive to network roundtrip propagation delay. As such, full-duplex Ethernet networks do not require an extension, which the (transmitting) media access control function, according to the present invention, forms only in a half-duplex environment. Thus, the invention is compatible with half-duplex and with full-duplex Ethernet environments.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1A:
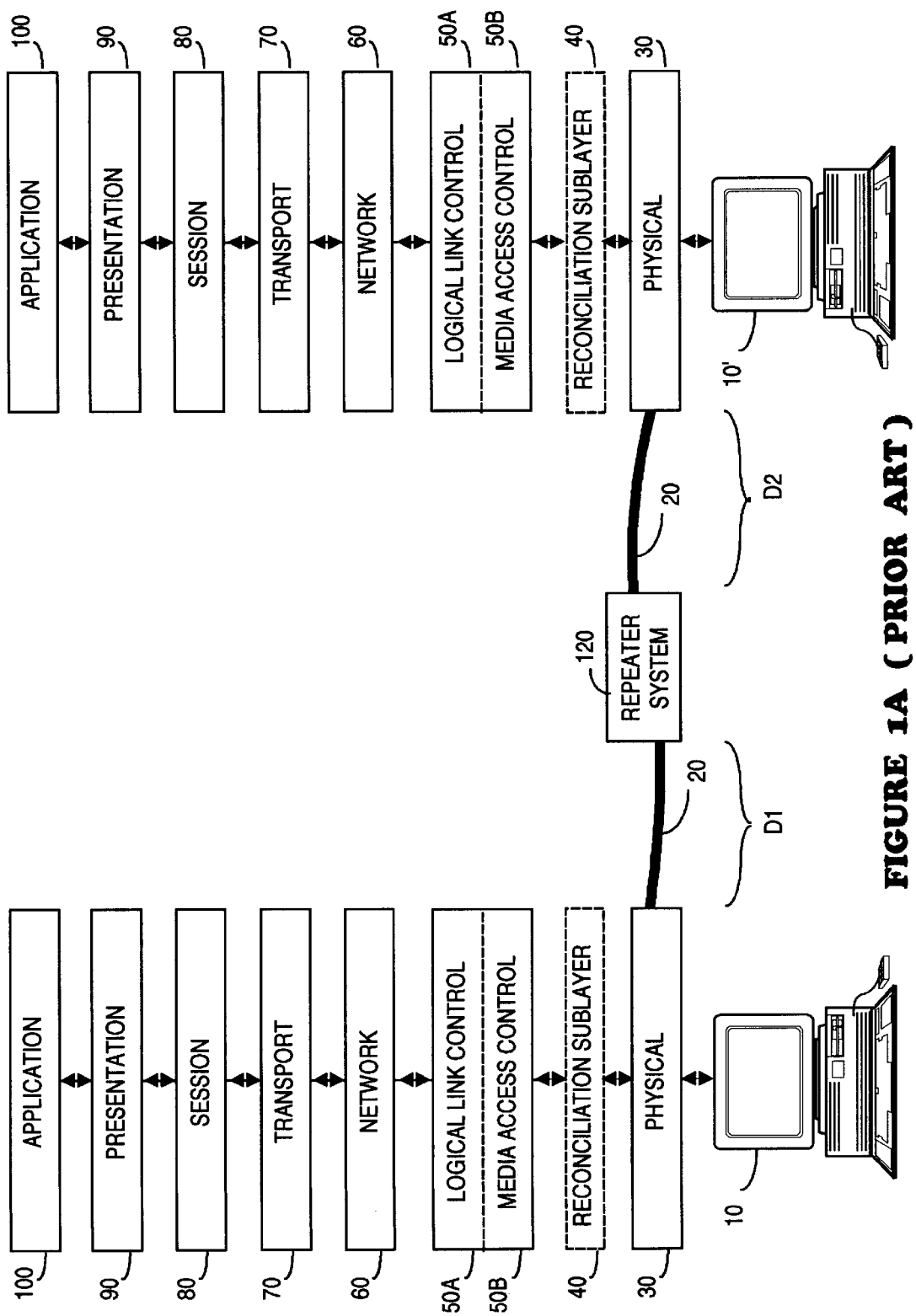
FIG. 1A depicts a network, according to the prior art.
Figure 1B:
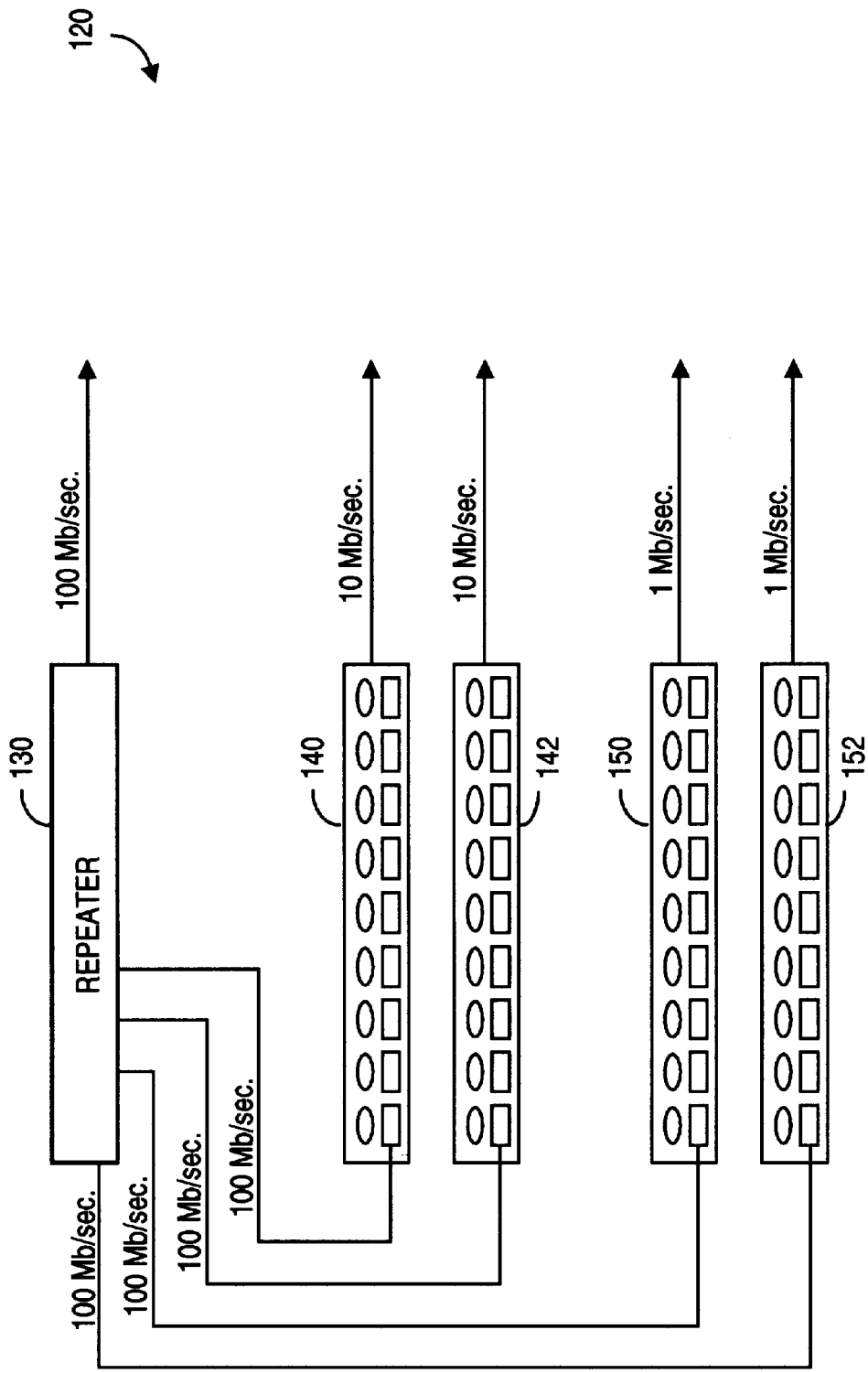
FIGS. 1B and 1C depict repeater system configurations, according to the prior art.
Figure 1C:
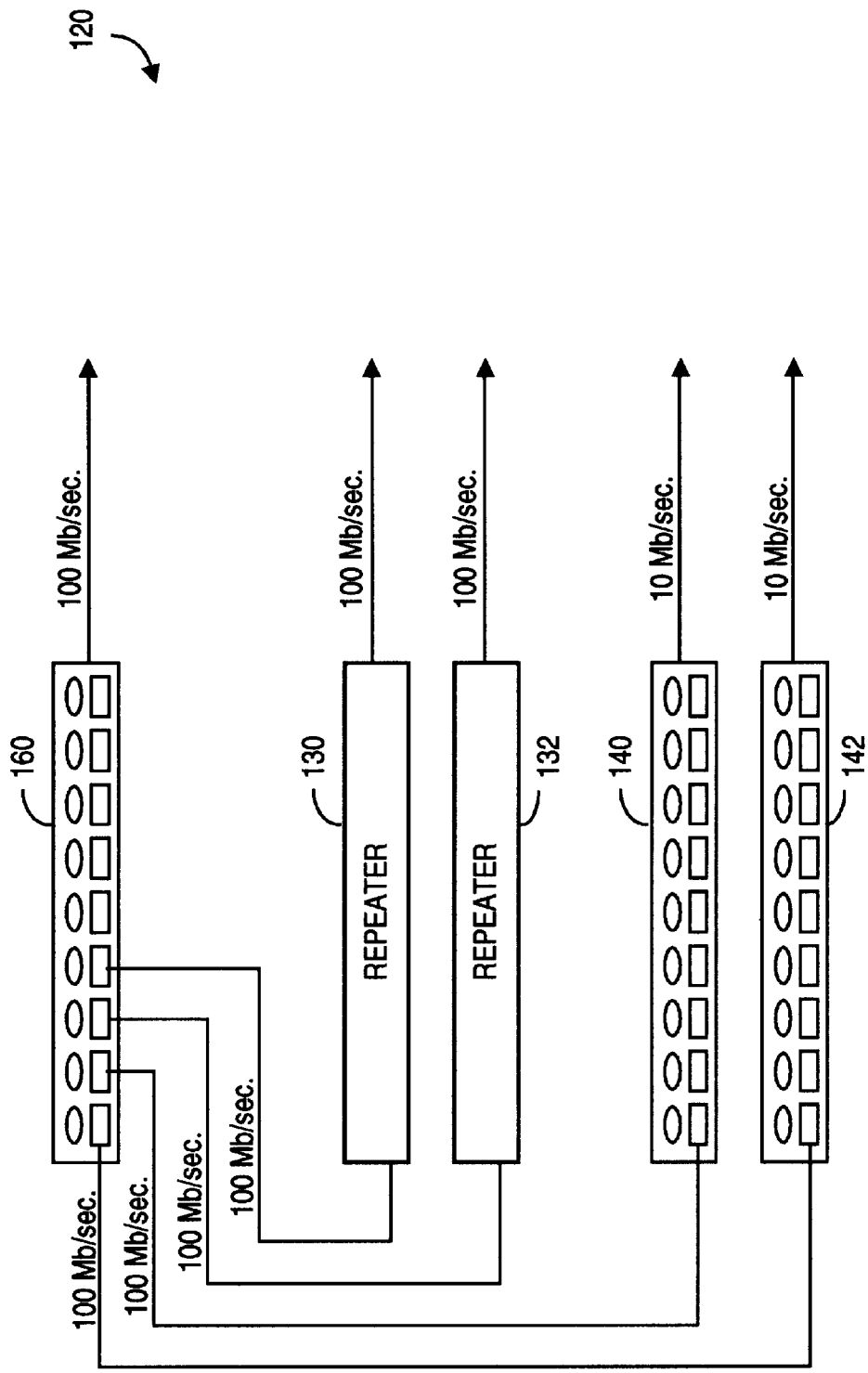
Figure 2A:
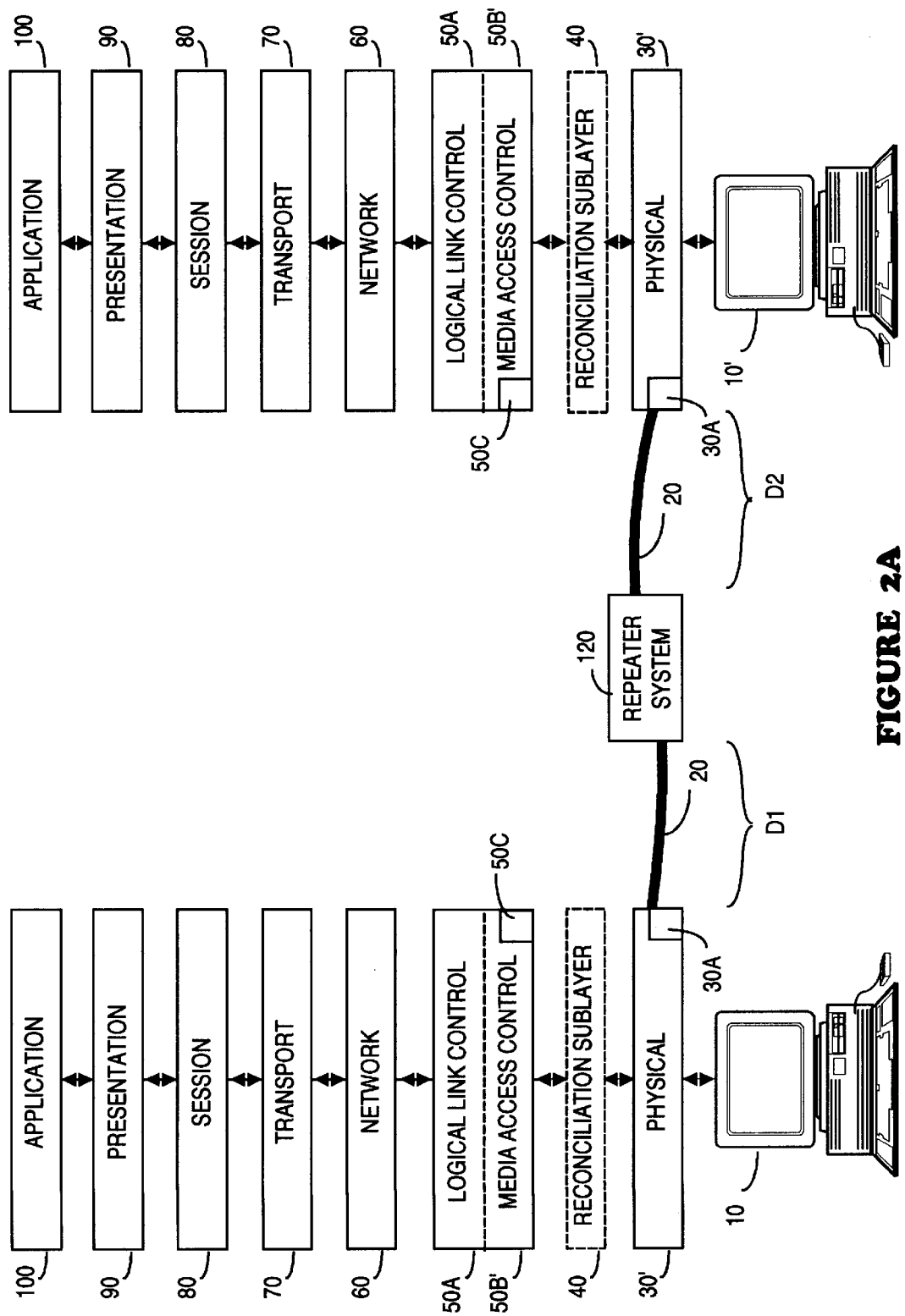
FIG. 2A depicts a 1000 Mb/sec. Ethernet network in which duration of a minimum size event is extended to be longer than the network roundtrip time, according to the present invention.

FIG. 2A depicts an Ethernet network that extends the duration of the minimum size event at 1000 Mb/sec. flowrates to ensure it exceeds the roundtrip ("R/T") time associated with the network. The system shown in many ways is similar to the prior art configuration of FIG. 1A, except that the transmit and receive media access control layers 50B', and physical layers 30' have been modified to include modified code, respectively 50C, 30A, implementing carrier extension, according to the present invention.

It will be appreciated that layers from and including the logical link control layer 50A and upward are unchanged, as are the computers 10, 10' and the interconnecting medium 20. However, repeater system 120 may now advantageously employ faster repeaters because the present invention enables 1000 Mb/sec. flowrates at distances up to at least 200 m. The slight modification made to the network system permits the network to be fully IEEE 802 compatible as well as complaint with the 802.3 standard.

Scaling CSMA/CD to 1000 Mb/sec. according to the present invention is advantageous for several reasons. The CSMA/CD protocol is both widely implemented and well understood, and has demonstrated low cost at flowrates of 10 Mb/sec. and 100 Mb/sec. Further, a cost advantage accrues when implementing a shared 1000 Mb/sec. system as opposed to a switched 1000 Mb/sec. system. In a shared environment, all network links operate at the same rate and computer stations contend for available bandwidth resources, whereas in a switched environment, various network links can operate at different rates, and contention arbitration occurs at switch device levels as opposed to within computer stations.

In practice, scaling CSMA/CD to 1000 Mb/sec. turns out to be not substantially more complicated than scaling to 100 Mb/sec. Linkage wire delays are ten times larger in bit time ("BT") at 1000 MB/sec. than at 100 Mb/sec. and a "decimal point shift" approach results in a very small collision domain diameter, e.g., 20 m. Further, as described herein, 1000 MB/sec. CSMA/CD scaling can be made backward compatible with 10 Mb/sec. and 100 Mb/sec. transmission rates.

Figure 2B:
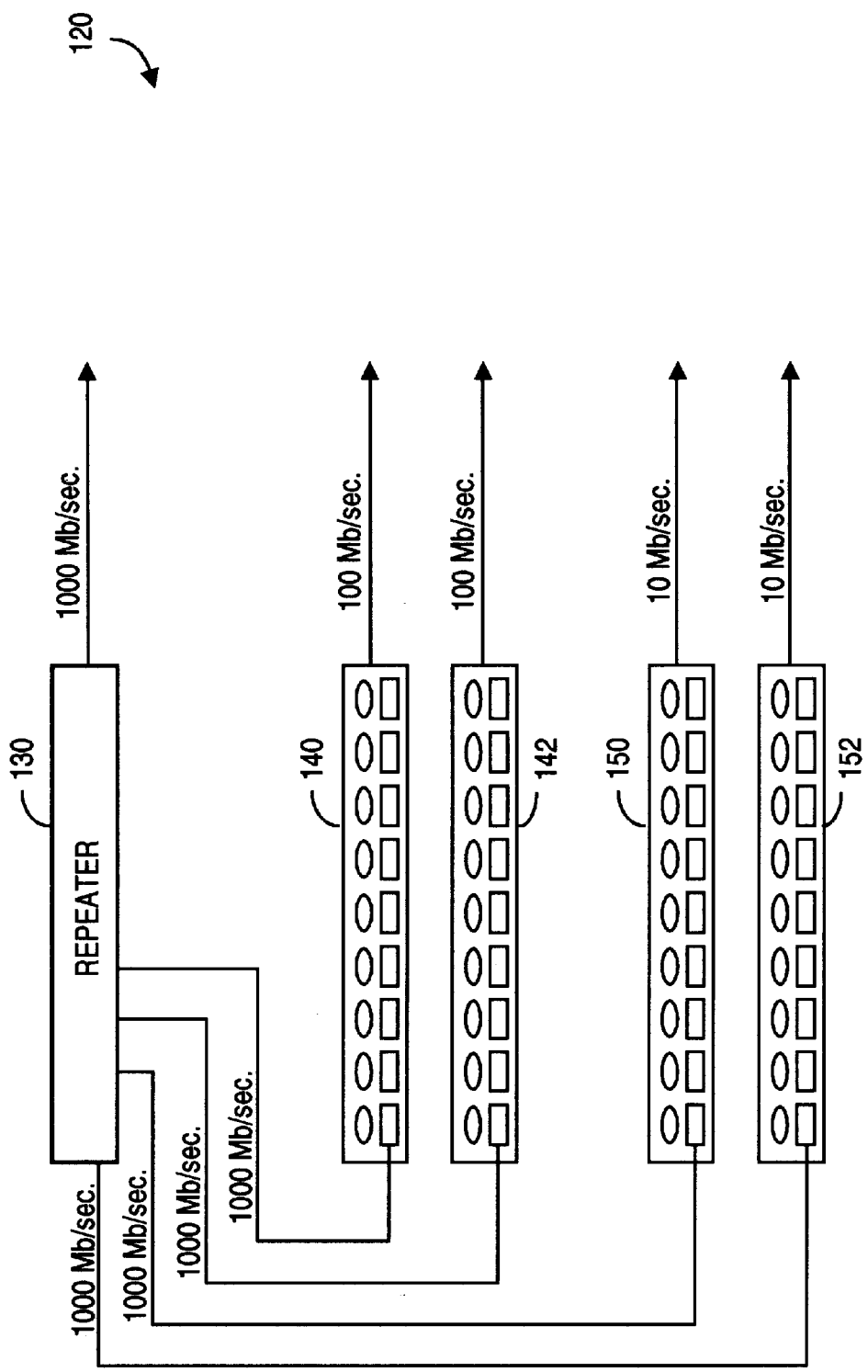
FIGS. 2B and 2C depict repeater system configurations suitable for 1000 Mb/sec. flowrate at 200 m distances, according to the present invention.

In practice, most useful CSMA/CD topologies have at least one repeater. FIG. 2B depicts a CSMA/CD topology as might be used in a single repeater collision domain, for example within a computer serve room. In FIG. 2B, repeater system 120 includes a single 1000 Mb/sec. repeater unit 130, as well as 100/1000 Mb/sec. switches 140, 142, and 10/1000 Mb/sec. switches 150, 152. In practice, the 1000 Mb/sec.

output from repeater 130 will go to one or more server computers, whereas the 100 Mb/sec. output from switches 140, 142 are suitable for high end desktop computers, and the slower 10 Mb/sec. output from switches 150, 151 are more suitable for lower end desktop computers.

Figure 2C:
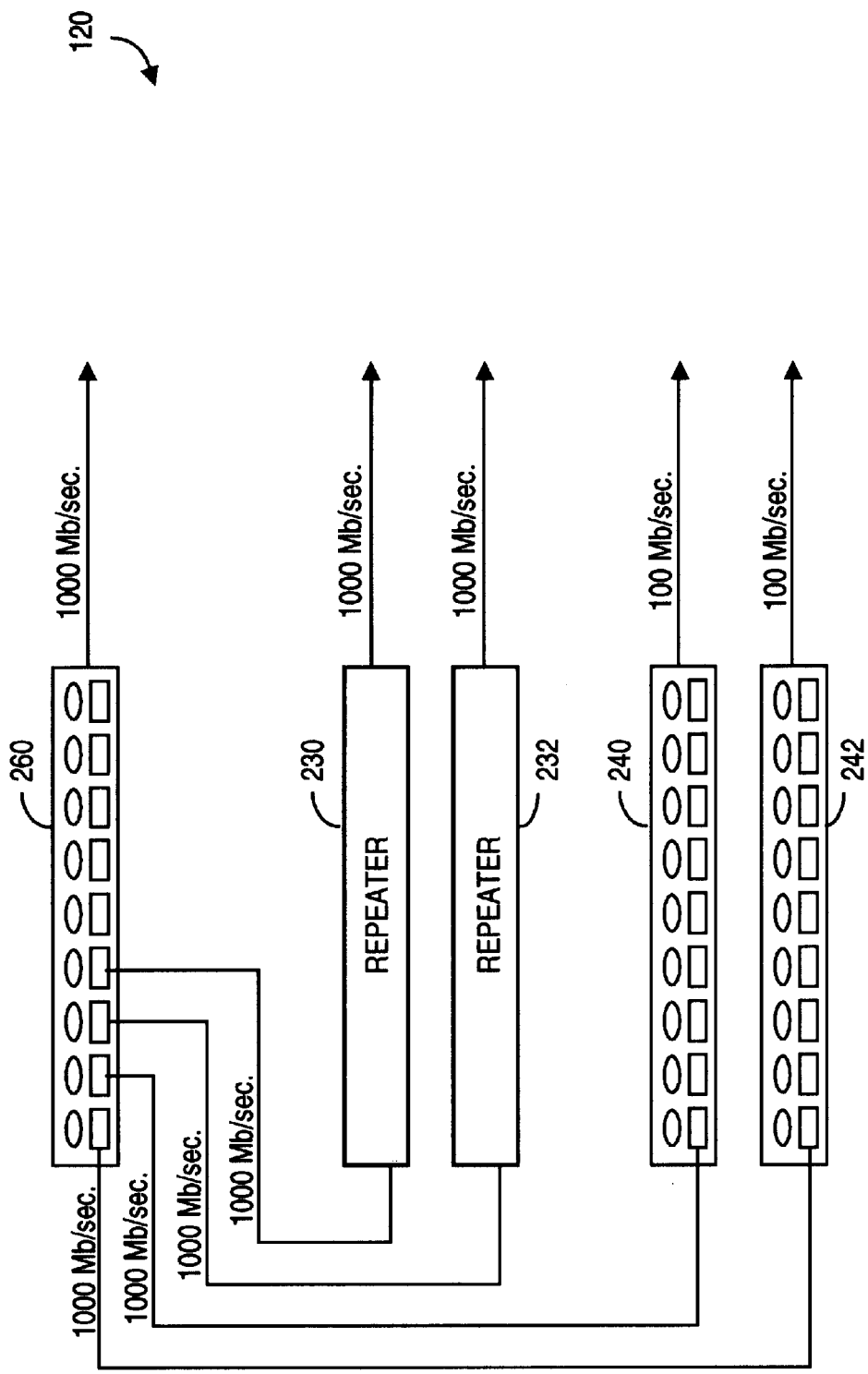

FIG. 2C depicts a CSMA/CD topology suitable for use in single repeater collision domains in which 1000 Mb/sec. horizontal runs are encountered. Unit 260 is a 1000 Mb/sec. switch whose 1000 Mb/sec. output is suitable for server computers, and ultra high end desk top computers. Units 230, 232 are 1000 Mb/sec. repeaters whose 1000 Mb/sec. outputs are suitable for higher end desktop computers, whereas units 240, 242 are 100/1000 Mb/sec. switches whose 100 Mb/sec. outputs are more suitable for high end desktop computers.

For network configurations including those shown in FIGS. 2B and 2C, it is understood that to be practical, a 1000 Mb/sec. CSMA/CD topology must support horizontal runs having a spanning diameter (D1+D2) up to at least 200 m. The topologies of FIGS. 2B and 2C are symmetrical or bidirectional in that signal flow can be right-to-left, or left-to-right.

The design of 1000 Mb/sec. systems includes calculation of a bit budget that can depend upon many factors. The relevant factors include physical layer ("PHY") signalling method and architecture, data path width of medium access control ("MAC") <=> PHY couplings, MAC state machine frequency, data path width of repeaters (e.g., repeater 130, 140, 142) and repeater state machine frequency, as well as fairness issues. In making a 1000 Mb/sec. bit budget analysis, several assumptions are made. For purposes of analysis, the PHY signalling method and architecture is assumed to be 8B/10B with BT≈1 ns, the MAC<=>PHY data path width is 16 bits, the MAC state machine frequency is 125 MHz, the repeater data path width is 16 bits and repeater state machine frequency is 125 MHz.

Figure 1D:
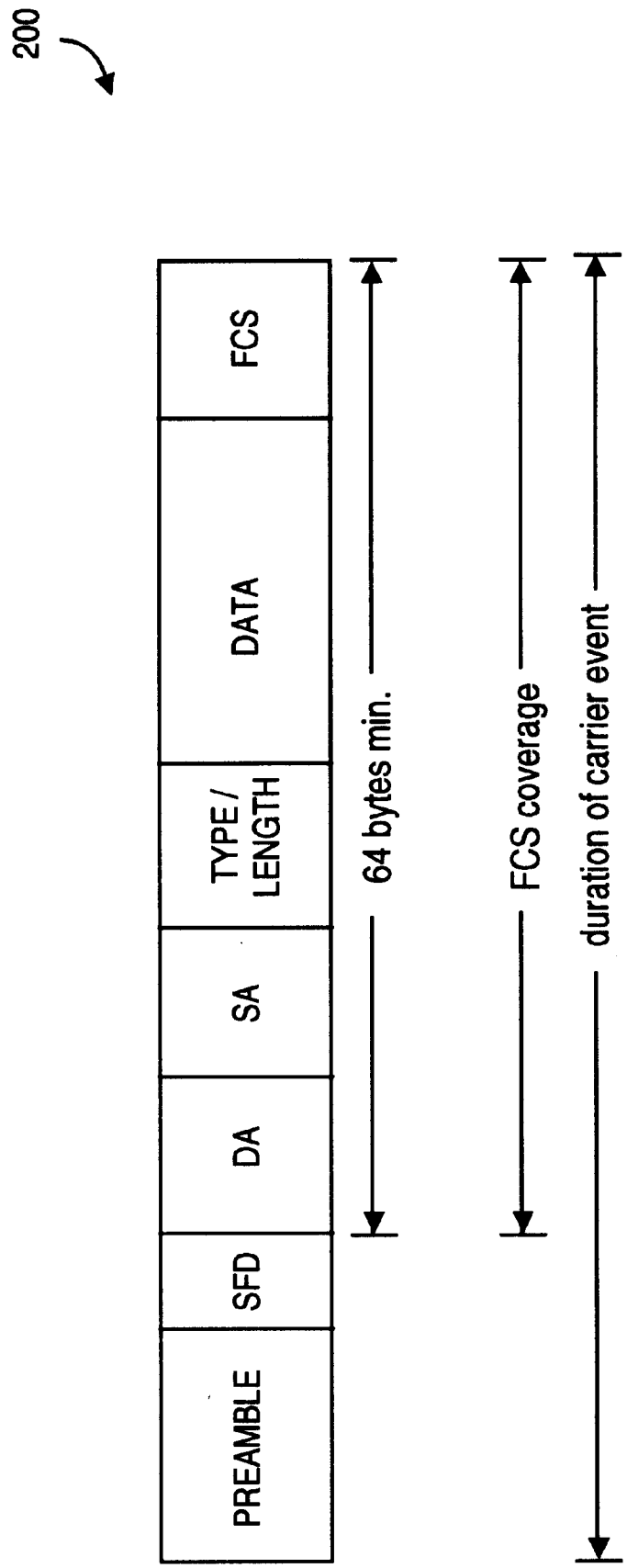
FIG. 1D depicts network packet format, according to the prior art.
Figure 2D:
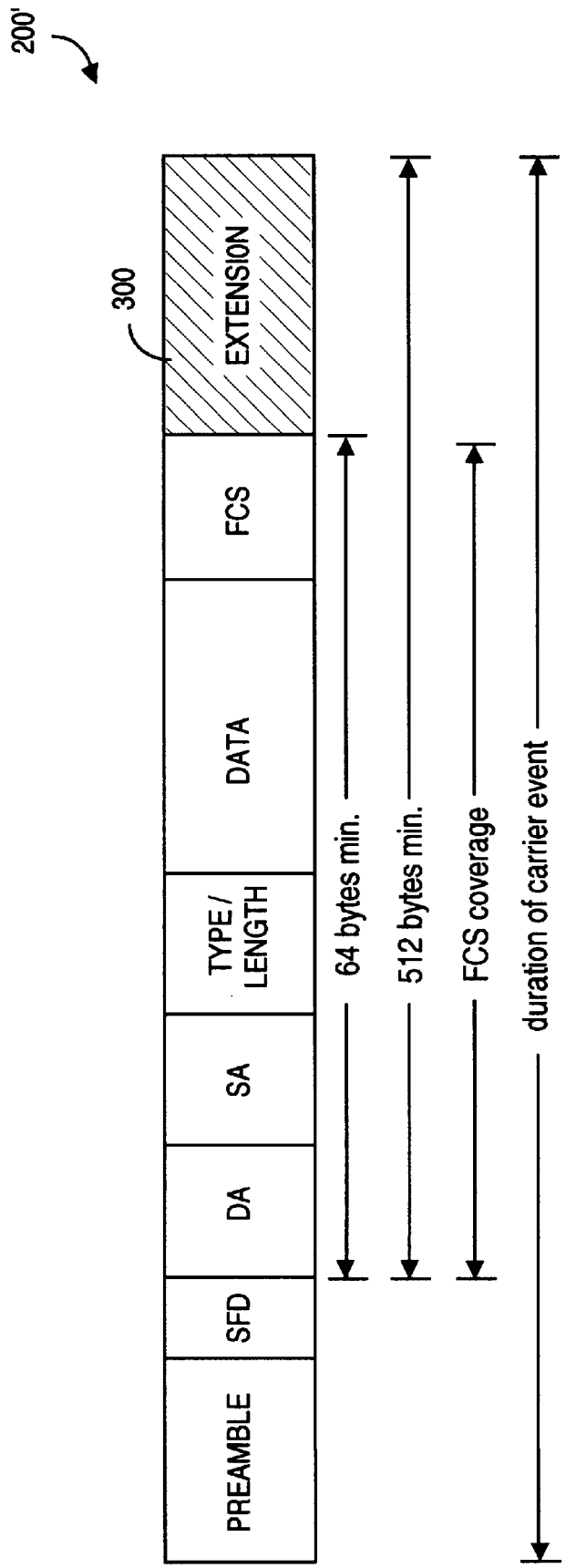
FIG. 2D depicts a modified network packet format in which an extension is provided as needed to ensure that a minimum size event has a duration exceeding the network roundtrip time, according to the present invention.

FIG. 2D depicts a modified network packet format used by the modified network of FIG. 2A. Packet 200' shown in FIG. 2D is similar to the prior art packet 200 shown in FIG. 1D except that an extension 300 is provided as needed at 1000 Mb/sec. The extension ensures that a minimum size event has a duration exceeding the network roundtrip time. The preferred relevant minimum sizes (expressed in bytes) used in the present invention are depicted in FIG. 2D. The extension is made using non-data symbols that are recognized as such by MAC 50B' and PHY 30'. In the preferred embodiment, extension starts on an octet boundary, and has an extension length that is N octets in length, where N is preferably an integer.

A brief explanation of what is meant by non-data symbols will now be given. A data symbol represents n binary bits of information, where the range of values for the data symbol is from 0 to $(2^n-1)$. In local area networks, it is common for the PHY layers to perform an encoding such that these data symbols are converted (or mapped) into a sequence of code symbols (or bits) before transmission onto the physical medium. However, the coding scheme employed in the prior art (and used herein) provides excess capacity beyond that needed to encode all necessary data symbols. Such excess capacity is available for use as either control symbols or reserved symbols. These control or reserve symbols are referred to herein as non-data symbols, i.e., symbols whose values lie outside the 0 to $(2^n-1)$ range.

In the preferred embodiment, non-data symbols that meet the following requirements may be used by the transmitting MAC layer to form carrier extension 300. First, the non-data symbols must cause the carrier sense signal ("CRS") to remain asserted throughout reception of the symbol. Second, the non-data symbols must be transmittable in series one at a time or in any integer number of symbols. Finally, the non-data signal must not conflict with or be confused with control symbols that might be employed for frame delimiting purposes. The non-data symbol selected to form the carrier extension may equivalently be referred to as an extension symbol.

The transmitting MAC selects the preferably integer value N for each packet transmitted. With reference to FIG. 2D, N is selected such that the sum of the length of the fields labelled (DA, SA, Type/length, DATA, FCS) when added to N is greater than or equal to 512 bytes, i.e., a duration exceeding the network roundtrip time.

Figure 3:
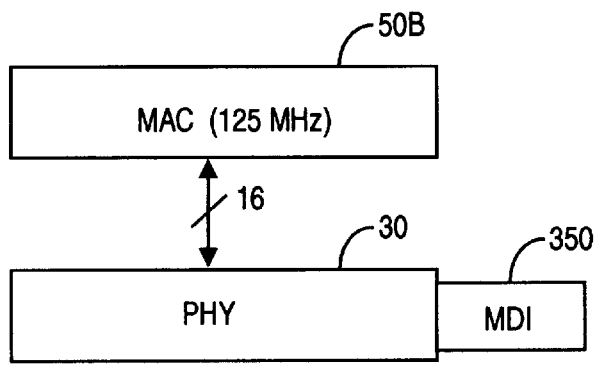
FIG. 3 depicts a model used to arrive at a bit budget, according to the present invention.

FIG. 3 depicts a simple case that was analyzed in the design of the present invention. The data terminal equipment ("DTE") model comprising a MAC layer 50B whose internal state machine operates at 125 MHz, and a PHY later 30 coupled to the MAC layer via a 16 bit-width data path. A medium dependent interface ("MDI") 350, e.g., a physical connector appropriate for link media 20, is coupled to PHY 30.

Tables 1A, 1B, 1C, following, set forth DTE delay elements expressed in bits for baseband transmission over fiber optics media at 100 Mb/sec. (100BASE-FX) and for 1000 Mb/sec. (1000BASE-F). Values shown under the 100BASE-FX column are well established data extracted from the IEEE 802.3 standard. The values shown under the 1000BASE-F column were data derived from the model shown in FIG. 3.

In these tables, TXEN is transmit enable, CRS is carrier sense and !CRS is the logical complement thereof. COL to MAC detect is time delay from assertion of a collision signal to detection of this signal by the MAC sub-layer, and JAM is the bit pattern emitted by the MAC sub-layer when a collision is detected. COL to JAM is the time delay from assertion of COL to the MAC's detection thereof, reaction thereto, and production of JAM.

In the tables that follows, it is not surprising that the 1000 Mb/sec. data reflect more bit time units ("BT") than the 100 Mb/sec. data. Understandably, data flowing through a DTE (e.g., a repeater) at 1000 Mb/sec. experience increased delays because data buses are wider, and clock speeds proportionally slower. Thus, to transport a byte through a DTE will require more bit times ("BT") at 1000 Mb/sec. than at 100 Mb/sec.

TABLE 1A

| MAC <=> PHY | MAC <=> PHY DELAY | |
|---|---|---|
| | 100BASE-FX | 1000BASE-F |
| MAC Tx to TXEN | 4 | 16 |
| CRS to MAC detect | 8 | 16 |
| !CRS to MAC detect | 8 | 16 |
| Worst case non defer | 16 | 48 |
| COL to MAC detect | 8 | 16 |
| !COL to MAC detect | 8 | 16 |
| COL to JAM | 16 | 48 |

TABLE 1B

PHY <=> MDI DELAY

| PHY <=> MDI | 100BASE-FX | 1000BASE-F |
|---|---|---|
| TXEN to MDI | 14 | 24 |
| MDI to CRS | 20 | 24 |
| MDI to !CRS | 24 | 40 |
| MDI to COL | 20 | 24 |
| MDI to !COL | 24 | 40 |
| TXEN to CRS | 4 | 16 |
| !TXEN to !CRS | 16 | 16 |

TABLE 1C

MAC <=> MDI DELAY

| MAC <=> MDI | 100BASE-FX | 1000BASE-F |
|---|---|---|
| MAX Tx to MDI out | 18 | 40 |
| MDI to MDI worse case non defer | 54 | 96 |
| MDI in to collision det | 28 | 40 |
| TOTAL for 2 DTEs | 100 | 176 |

Table 2 below provides estimates of repeater delays for different classes of repeaters, wherein SOP denotes start of packet, and SOJ denotes start of JAM.

TABLE 2

ESTIMATED REPEATER DELAY

| Class I Repeater | 100BASE-FX | 1000BASE-F |
|---|---|---|
| SOP | 80 | 140 |
| SOJ | 60 | 140 |
| Total: SOP + SOJ | 140 | 280 |

Table 3A itemizes bit budget estimates for a single repeater topology, assuming a 200 m length of fiber optic cable having standard 5.05 ns/m characteristics.

TABLE 3A

200 m FIBER OPTIC CABLE ESTIMATES

| Class I Repeater | 100BASE-FX | 1000BASE-F |
|---|---|---|
| DTE Delay | 100 | 176 |
| Repeater SOP + SOJ | 140 | 280 |
| Cable Delay R/T | 202 | 2020 |
| Total R/T (bits) | 442 | 2476 |
| Total R/T (bytes) | 55.25 | 309.5 |

The problem represented by the data in FIG. 3A is as follows. At 100 Mb/sec., total roundtrip delay in byte time may be a maximum of 64, and thus the 100BASE-FX data are acceptable. But the 1000 Mb/sec. 1000BASE-F data produces a roundtrip delay of 309.5 byte times, which exceeds the prior art limit of 64 byte times by a factor of almost five. But for the present invention, the R/T byte ceiling of 64 would be insurmountable at 1000 Mb/se c. for a 200 m diameter. However, the carrier extension provided by the present invention advantageously raises the permissible ceiling from 64 byte times to 512 byte times (or 4096 bit times, BT).

Table 3B depicts bit budget estimates for a single repeater topology, assuming a 20 m length of fiber optic cable having standard 5.05 ns/m characteristics. But for the present invention, the 82.25 roundtrip byte delay at 1000 Mb/sec. associated with a relatively short 20 m diameter would not be feasible, as 82.25 exceeds the prior art 64 byte ceiling.

TABLE 3B

20 m FIBER OPTIC CABLE ESTIMATES

| Class I Repeater | 1000BASE-FX |
|---|---|
| DTE Delay | 176 |
| Repeater SOP + SOJ | 280 |
| Cable Delay R/T | 202 |
| Total R/T (bits) | 658 |
| Total R/T (bytes) | 82.25 |

The above bit budget analysis provides several useful conclusions. The proposed bit budget can provide greater margin at 1000 Mb/sec. than is available at 100 MB/sec. in 100BASE-T. By greater margin it is meant that at 100 Mb/sec. the margin in byte times is the different between the target 64 byte times and the actual 55.25 byte times, which is a margin of 8.75 byte times. By contrast, at 1000 Mb/sec., the present invention extends the target 64 byte time to 512 byte times, and at this higher flowrate provides a margin of 512–309.5 or 202.5 byte times.

It is seen that cable delay dominates total delay, but even with short 20 m cables, the bit budget exceeds 512 byte times, and even here the assumed DTE and repeater delay estimates may be somewhat optimistic. From the foregoing it will be appreciated that according to the present invention, the minimum frame size is increased upwards from 512 bytes to provide useful topologies at 1000 MB/sec. over diameters at least up to 200 m. Thus, the present invention adopts a new minimum frame size of 512 Bytes using the carrier extension 300 depicted in FIG. 2D.

The foregoing description of the bit budget analysis amply demonstrates the need for the present invention. Indeed, without the present invention, flowrates exceeding 100 Mb/sec. at diameter distances up to at least 200 m are hardly feasible. However, alternative approaches to the present invention were also considered, but were found lacking. One alternative might be to increase the minFrameSize parameter to 512 Bytes, but so doing will have harmful side effects. One side effect is degradation of the maximum small packet rate on full-duplex links where is it not necessary to use the proposed larger minimum size. Further, the size-inflated packets cannot be propagated to existing 100 Mb/sec. or 10 Mb/sec. networks without very substantial loss in performance.

The 802.3 MAC provides a padding/stripping mechanism that conceivably could be used to increase the length of the frame in a manner that would not impact performance of slower speed networks. However, such mechanism cannot be relied upon when using protocol stacks that use an Ethernet frame format as the Ethernet frame format is incompatible with the padding/stripping mechanism. Thus, the challenge successfully met by the present invention is to provide a mechanism whereby minimum frame size is extended only on 1000 Mb/sec. CSMA/CD networks, regardless of whether an Ethernet or an 802.3 frame format is used. In essence, the present invention can increase the (flowrate)x(diameter distance) product.

As shown by FIG. 2D, the present invention extends the time duration of the carrier event, without extending the data field, or altering the FCS field. Such extension is achieved by introducing a new mechanism that appends non-data symbols to the end of short frames. The collision window is extended to include these symbols, and the extension is included in the fragment discard calculation. Finally, the extension is removed before checking the FCS and passing the frame to logical link control 50A ("LLC").

Those skilled in the art will appreciate that while Pascal code provides the formal specification of desired MAC layer behavior, generally MAC layers are not implemented using Pascal. Indeed, MAC layers can be implemented in any fashion providing the resultant layer behaves in the manner specified by the following Pascal pseudo code. In the following code, the IEEE 802.3 Pascal definition for the MAC layer is shown in normal type, and amended or new code according to the present invention is set forth below in bold type. Thus, it is important to appreciate that the present invention is not limited to Ethernet networks whose MAC layers are implemented with Pascal code. As noted in FIG. 2A, code modification to the MAC layers is denoted as SOC, and nomenclature code modification to the PHY layers is noted as 30A.

Implementing the present invention impacts the MAC layer as follows. A new constant is defined as:

```
    const
        extendSize = ...; {in bits,
            implementation-dependent}
        extensionBit= ...; {a new type of non-data bit}
New transmit and receive state variables are defined as:
    var
        extension:0..extendSize; {length of extension}
    var
        extendcount:0..extendSize; {count of extension bits
            at end of frame}
A modification is made to StartTransmit as follows:
    procedure StartTransmit;
    begin
        extension := 0;
        currentTransmitBit :=1;
        lastTransmitBit :=frameSize;
        transmitSucceeding := true;
        transmitting := true;
        lastHeaderBit := headerSize
    end; {StartTransmit}
A modification to StartReceive is made as follows:
    procedure StartReceive;
        begin
            currentReceiveBit :=1;
            extendCount := 0;
            receiving := true
        end; {StartReceive}
Modifications to the MAC (Transmitter) are made as fol-
lows:
    process BitTransmitter;
    begin
        cycle {outer loop}
            if transmitting then
                begin {inner loop}
        if halfDuplex then (extension: = minFrameSize
                + extendSize);
            PhysicalSignalEncap; {send preamble and sfd}
            while transmitting do
            begin
                if currentTransmitBit > lastTransmitBit then
                    TransmitBit(extensionBit)
                else
                    TransmitBit (out-
                        goingFrame[currentTransmitBit]);
                if newCollision then StartJam else NextBit
                end;
            end; {inner loop}
        end; {outer loop}
    end; {BitTransmitter}
Modification to NextBit and to StartJam in the MAC
(transmitter) are made as follows:
    procedure NextBit;
        begin
            currentTransmitBit :=currentTransmitBit + 1;
            transmitting :=((currentTransmitBit≦lastTransmitBit)
                or (currentTransmitBit≦extension))
        end; {NextBit}
    procedure StartJam;
        begin
            currentTransmitBit := 1;
            lastTransmitBit :=jamSize;
            extension :=0;
            newCollision :=false
        end; {StartJam}
Finally, within the Mac (Transmitter), WatchForCollision
is modified as follows:
    procedure WatchForCollision;
    begin
        if transmitSucceeding and CollisionDetect then
        begin
            if currentTransmitBit>(minFrameSize − header-
                Size + extendSize) then
                lateCollisionError :=true;
            newCollision:=true;
            transmitSucceeding :=false
        end
    end {WatchForCollision}
In the preferred implementation, modification to the MAC
(Receiver) BitReceiver and ReceiveLinkMgmt code is made
as follows:
    process BitReceiver;
        var b: Bit;
    begin
        cycle {outer loop}
            while receiving do
                begin {inner loop}
                if currentReceiveBit = 1 then
                    PhysicalSignalDecap; {strip off the preamble
                        and sfd}
                b := ReceiveBit; {get next bit from physical
                    Media Access}
                if receiveDataValid then
                    if b = extensionBit then
                        extendCount :=extendCount+1
                    else
                        begin {append bit to frame}
                            incomingFrame[currentReceiveBit] :=b;
                            currentReceiveBit :=currentReceiveBit + 1
                        end
                receiving := receiveDataValid
                end {inner loop}
            frameSize := currentReceiveBit− 1 + extendCount
        end {outerloop}
    end; {BitReceiver}
The MAC (Receiver) ReceiveLinkMgmt modification is as
follows:
    procedure ReceiveLinkMgmt;
    begin
        repeat
            StartReceive;
            while receiving do nothing; {wait for frame to fin-
                ish arriving}
            excessBits := frameSize mod 8;
            frameSize :=frameSize − excessBits; {truncate to
                octet boundary]
            if halfDuplex then
                begin
                    receiveSucceeding :=((frameSize≧(minFrameSize
                        + extendSize));
                    frameSize :=frameSize − extendCount
                end
            else
                receiveSucceeding := (frameSize≧minFrameSize);
        until receiveSucceeding
    end;
```

TABLE 4

NEW PARAMETERS USED IN PRESENT INVENTION

| PARAMETER | VALUE |
|---|---|
| slotTime | 4096 bit times |
| interFrameGap | 96 ns |
| attemptLimit | 16 |
| backoffLimit | 10 |
| jamSize | 32 bits |
| maxFrameSize | 1518 octets |
| minFrameSize | 512 bits (64 octets) |
| addressSize | 48 bits |
| extendSize | 448 octets |

Semantics associated with the reconciliation sublayer are preferably modified as follows. For the semantics of the service primitive PLS_DATA.request, EXTEND is added to the range of values communicated by the OUTPUT_UNIT parameter. For the semantics associated with the service primitive PLS_DATA.indicate, EXTEND is added to the range of values communicated by the INPUT-UNIT parameter. Implementing these changes may be accomplished using techniques known to those skilled in the relevant art.

In the following Tables 5 and 6, and corresponding FIGS. 4A and 4B, the following abbreviations are used:

txpps is aggregate transmit packets/sec.

rxpps is aggregate receive packets/sec.

colps is aggregate collisions/sec.

oerrps is aggregate excessive CollisionErrors/sec.

udp is user datagram protocol udput is udp utilization, multiply txpps by 1538 colut is collision utilization, multiply colps by slot time

Figure 4A:
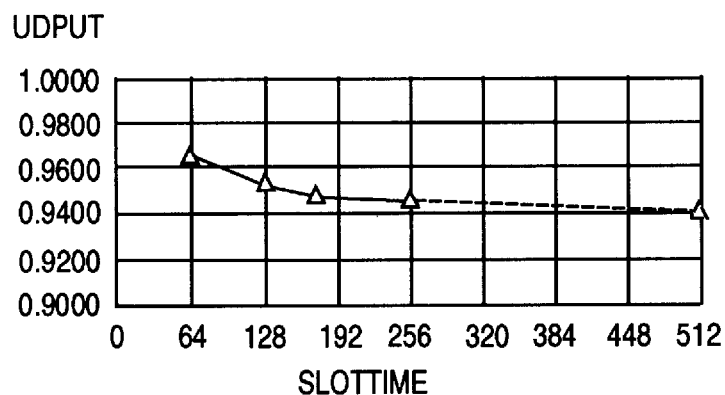
FIGS. 4A and 4B depict experimental and simulated results obtained for small and larger diameter networks, according to the present invention.
Figure 4B:
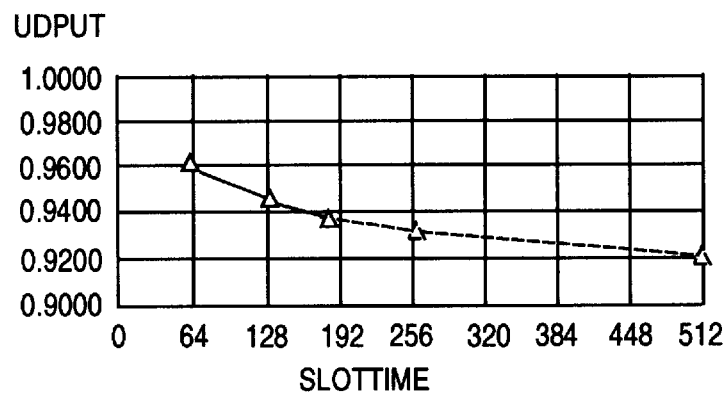

Data in Tables 5 and 6, and FIGS. 4A and 4B reflect experimental and simulated results (tabulated with italics, and graphed with a phantom line) obtained using a four-node scaled 100BASE-FX network with four Sun Ultra 1/170E workstations (e.g., 167 MHz ultraSPARC uniprocessor, Solaris 2.5 kernel, 100BASE-T motherboard interface, Cisco (Grand Junction) 100BASE-FXS fast hub 100, LAN-CAST and Canary 100BASE-FX transceivers, a ttcp traffic generator providing four simultaneous streams of user datagram protocol ("UDP") frames, 1500 byte UDP packets, and 2 m, 100 m, 400 m, 600 m, and 800 m lengths of fiber optic cable, the links being equal length for each station. Each station presented 100% offered load, with tests being run for three minutes with statistics gathered during the last two minutes from each individual station. Statistics were averaged over the course of the test and normalized to a one second interval, and are presented here as aggregate values summed across all four stations. In the tests, the Tx minFrameSize, Rx minFrameSize, and slotTime parameters were adjusted, and the Tx and Rx minFrameSizes were used to simulate behavior of the carrier extension 300 shown in FIG. 2D. Parameters were stepped through values of 64 bytes, 128 bytes, 174 bytes and 256 bytes. For each set of parameters, one case was run with one repeater having 2 m links, and one case with one repeater having the longest links allowed by the parameters.

TABLE 5

| diameter | 4 | 4 | 4 | 4 | 4 |
|---|---|---|---|---|---|
| slottime | 64 | 128 | 174 | 256 | 512 |
| txpps | 7851.25 | 7757.53 | 7705.84 | 7693.82 | 7650.00 |
| rxpps | 7851.74 | 7747.95 | 7730.31 | 7681.88 | 7650.00 |
| colps | 4883.98 | 2686.02 | 2043.07 | 1427.18 | 800.00 |
| oerpps | 127.18 | 61.72 | 44.58 | 30.29 | 15.00 |
| udput | 0.9648 | 0.9532 | 0.9469 | 0.9454 | 0.9400 |
| colut | 0.0328 | 0.0318 | 0.0284 | 0.0315 | 0.0300 |

TABLE 6

| diameter | 200 | 800 | 1200 | 1600 | 2000 |
|---|---|---|---|---|---|
| slottime | 64 | 128 | 174 | 256 | 512 |
| txpps | 7805.66 | 7681.15 | 7626.95 | 7560.00 | 7440.00 |
| rxpps | 7803.63 | 7691.94 | 7634.31 | 7560.00 | 7440.00 |
| colps | 4835.01 | 2641.13 | 1940.92 | 1426.00 | 800.00 |
| oerrps | 123.45 | 61.25 | 46.08 | 30.00 | 15.00 |
| udput | 0.9592 | 0.9439 | 0.9372 | 0.9289 | 0.9142 |
| colut | 0.0325 | 0.0313 | 0.0301 | 0.0313 | 0.0340 |

Tables 5 and 6 indicate the increasing slot time and minimum carrier duration does not significantly degrade throughput for full size packets. Further, the data indicate very good correlation between experiments and simulations, and confirm 200 m topologies for CSMA/CD operating at 1000 Mb/sec. according to the present invention.

To recapitulate, according to the present invention, the transmitting MAC layer creates an extension by appending an appropriate number of non-data symbols to the end of a packet. The extension length is such that the minimum packet carrier event has a time duration at least as large as the network roundtrip time. This extension functionally decouples frame size to roundtrip time constraints and permits flowrates greater than 100 Mb/sec. and indeed 1000 Mb/sec. at network diameters up to at least 200 m. The extension duration is implemented without extending data field lengths or altering frame check sequence fields. The transmitting MAC monitors the transmission medium for collisions during the duration of an extension, and treats collisions occurring before the extension end normally, i.e., appropriate backoff and retransmission will occur. Should a collision be detected, the transmitting MAC will cease to append non-data symbols to the packet end. The transmitting PHY layer encodes the non-data symbols produced by the transmitting MAC layer into an appropriate code for transmission onto the network physical medium.

On the receiving side of the network, the receive PHY later decodes a specific non-data code and produces therefrom a non-data symbol that the receiving MAC will interpret as an extension symbol, according to the present invention. The receiving MAC, upon receipt of these non-data symbols from the receiving PHY, counts and then strips the symbols from the end of the incoming data stream. The receiving MAC includes the count number of the received non-data symbols in its calculations of received frame size, for purpose of distinguishing collision fragments.

The present invention has been described in detail with respect to carrier extending and sending a single packet per transmit opportunity. However, those skilled in the art will appreciate that the carrier extension aspect of the present invention could also be used in an embodiment that sent multiple small packets per transmit opportunity. Such further embodiment likely would demonstrate improved utilization.

Modifications and variations may be made to the disclosed embodiments without departing from the subject and spirit of the invention as defined by the following claims.

What is claimed is:

1. In a carrier sense multiple access collision detection (CSMA/CD) Ethernet network, a method of increasing at least one of network flowrate and network diameter distance, the method including functionally decoupling size of data frames comprising packets carried by said network from roundtrip transmission time of said network by extending time duration of a minimum packet carrier event so that said event is at least as large as roundtrip transmission time of said network.

2. The method of claim 1, wherein extending time duration is accomplished using at least one procedure selected from a group consisting of (i) said duration is extended without extending data field lengths in said packets, (ii) said duration is extended without altering frame check sequence fields associated with said packets, (iii) said duration is extended only in half-duplex environments, and (iv) said duration is extended by appending at least one non-data symbol to an end of a packet whose duration would otherwise be less than said network roundtrip transmission time.

3. The method of claim 1, wherein said network has at least one characteristic selected from the group consisting of (i) said flowrate exceeds 100 Mb/sec., (ii) said flowrate is 1000 Mb/sec., and (iii) said diameter extends to at least 200 m.

4. The method of claim 1, wherein:
in a half-duplex network environment said time duration is extended by a media access control (MAC) layer in a transmitting station in said network appending non-data symbols to an end of a packet carried by said network to cause duration of said packet to be at least as long as said network roundtrip transmission time; and
in a full-duplex network environment said duration is not extended.

5. In a carrier sense multiple access collision detection (CSMA/CD) Ethernet network operable at a flowrate exceeding 100 Mb/sec., a method permitting a network diameter distance of up to at least 200 m, the method comprising functionally decoupling size of data frames comprising packets carried by said network from roundtrip transmission time of said network by extending time duration of a minimum packet carrier event so that said event is at least as large as said roundtrip transmission time of said network.

6. The method of claim 5, wherein extending time duration is accomplished such that at least one characteristic occurs selected from a group consisting of (i) said duration is extended without extending data field lengths in said packets, (ii) said duration is extended without altering frame check sequence fields associated with said packets, (iii) said duration is extended only in half-duplex environments, and (iv) said duration is extended by appending at least one non-data symbol to an end of a packet whose duration would otherwise be less than said network roundtrip transmission time.

7. The method of claim 5, wherein extending time duration is accomplished at a media access control (MAC) layer in a transmitting station in said network in a half-duplex network environment, said MAC appending a sufficient number of non-data symbols to an end of a packet carried by said network to cause duration of said packet to be at least as long as said network roundtrip transmission time, wherein in a full-duplex network environment said duration is not extended.

8. The method of claim 5, wherein said flowrate is 1000 Mb/sec.

9. In a carrier sense multiple access collision detection (CSMA/CD) Ethernet network comprising at least a first computer station coupled over a diameter distance to a second computer station, functionality of each said station being definable as at least a physical (PHY) layer used to transmit and receive and a media access control layer (MAC) used to transmit and receive, a method permitting greater than 100 Mb/sec. transmission flowrate in said network over a diameter distance up to at least 200 m, the method including functionally decoupling size of data frames in packets carried by said network from network roundtrip time by extending time duration of a minimum packet carier event so that said event is at least as large as said network roundtrip transmission time.

10. The method of claim 9, wherein extending time duration is accomplished using at least one procedure selected from a group consisting of (i) said duration is extended without extending data field lengths in said packets, (ii) said duration is extended without altering frame check sequence fields associated with said packets, (iii) said duration is extended only in half-duplex environments, and (iv) said duration is extended by appending at least one non-data symbol to an end of a packet whose duration would otherwise be less than said network roundtrip transmission time.

11. The method of claim 9, wherein extending time duration is implemented within a said MAC layer in a transmitting said station.

12. The method of claim 11, wherein said MAC layer in the transmitting station performs at least one function selected from the group consisting of (i) said MAC layer extends said duration by appending a sufficient number of non-data symbols to an end of said packets to cause duration of said packets to be at least as large as said roundtrip time, (ii) said MAC layer extends said duration in half-duplex environments by appending a sufficient number of non-data symbols to an end of said packets to cause duration of said packets to be at least as large as said roundtrip time but in full-duplex environments does not extend said duration, (iii) said MAC layer monitors said medium for collisions throughout duration of the extended said duration and treats packet collisions occurring before end of the extended said duration as normal collisions, and (iv) said MAC layer monitors said medium for collisions throughout duration of the extended said duration and treats packet collisions occurring before end of the extended said duration as normal collisions and upon detection of any said collisions, said MAC layer ceases to append non-data symbols to an end of said packet.

13. The method of claim 9, wherein time duration is extended within a said MAC layer in a transmitting station that produces and appends a sufficient number of non-data symbols to an end of said packet to cause duration of said packet to be at least as long as said network roundtrip transmission time, said non-data symbols being encoded by a said PHY layer in the transmitting station into an appropriate code for transmission on said medium.

14. The method of claim 9, wherein extending time duration is carried out by a transmitting said station that appends at least one non-data symbol to an end of a packet whose duration would otherwise be less than said network roundtrip transmission time, and wherein a said PHY layer in a receiving said station decodes a specific non-data code and produces therefrom a non-data symbol interpretable as an extension symbol by a said MAC layer in the receiving station.

15. The method of claim 14, wherein said MAC layer in said receiving station receives non-data symbols from said PHY layer in said receiving station, counts said non-data symbols, and strips said non-data symbols from an end of an incoming data stream.

16. The method of claim 15, wherein said MAC layer in said receiving station includes a count of received non-data symbols in its calculation of received frame size, wherein collision fragments are distinguished.

17. The method of claim 9, wherein said flowrate is 1000 Mb/sec.

* * * * *